US012709989B2

(12) United States Patent
Hoyt et al.

(10) Patent No.: US 12,709,989 B2
(45) Date of Patent: Aug. 18, 2026

(54) VARIABLE VANE LEVER ARM

(71) Applicant: RTX Corporation, Farmington, CT (US)

(72) Inventors: Samuel B. Hoyt, Farmington, CT (US); Fadi Samir Maalouf, East Hampton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/041,802

(22) Filed: Jan. 30, 2025

(65) Prior Publication Data

US 2026/0218621 A1 Jul. 30, 2026

(51) Int. Cl.
*F01D 17/14* (2006.01)

(52) U.S. Cl.
CPC .......... *F01D 17/14* (2013.01); *F05D 2240/12* (2013.01)

(58) Field of Classification Search
CPC ........ F01D 9/041; F01D 17/14; F01D 17/148; F01D 17/16; F01D 17/162; F01D 17/165; F05D 2240/12
See application file for complete search history.

(56) References Cited

U.S. PATENT DOCUMENTS 6,019,574 A * 2/2000 DiBella ................ F04D 29/563 415/148
7,223,066 B2 5/2007 Rockley
7,344,355 B2 * 3/2008 Wilshaw ............... F01D 17/162 415/209.3
9,988,926 B2 * 6/2018 Gasmen ................ F01D 17/162
10,018,069 B2 7/2018 Osborne et al.
10,253,646 B2 * 4/2019 Pudvah ................. F01D 17/162
10,590,795 B2 * 3/2020 Pratt ....................... F01D 9/041
10,830,090 B2 11/2020 Mairhanser
10,837,309 B2 11/2020 Pratt et al.
2016/0032759 A1 2/2016 Gasmen et al.
2018/0163560 A1 6/2018 Mairhanser
2022/0341342 A1 10/2022 Nauss et al.

FOREIGN PATENT DOCUMENTS

FR 2897120 A1 * 8/2007 .......... F04D 29/563

OTHER PUBLICATIONS

FR-2897120-A1 (Year: 2007)—English translated specification.*
Office Action dated Jul. 24, 2025 for U.S. Appl. No. 19/041,827.

* cited by examiner

*Primary Examiner* — Brian P Wolcott
(74) *Attorney, Agent, or Firm* — Bachman & LaPointe, P.C.

(57) ABSTRACT

A vane arm has: a first end and a second end; a shank extending between the first end and the second end and having a first face and a second face; a first hole in the shank proximate the first end; a second hole in the shank proximate the second end; and a transverse groove in the first face intersecting the second hole. The groove has: a base; a first open end and a second open end; a first side face and a second side face. An asymmetry between the groove first side face and second side face provides for uniquely angularly registering the vane arm to a shaft.

19 Claims, 10 Drawing Sheets

VARIABLE VANE LEVER ARM

BACKGROUND

The disclosure relates to variable lever arms. More particularly, the disclosure relates to vane lever arms such as used for variable vanes of a gas turbine engine.

Gas turbine engines (used in propulsion and power applications and broadly inclusive of turbojets, turboprops, turbofans, turboshafts, industrial gas turbines, and the like) may include variable vane stages in one or more sections of the engine. In a variable vane stage, a circumferential array of vane airfoils are each rotatable about the respective associated axis of rotation. The vane airfoils may each be mounted for such a rotation to an inner diameter (ID) platform/shroud or inner casing and an outer diameter (OD) shroud or outer casing. Vane rotation may be driven by respective lever arms typically mounted to an outer diameter (OD) shaft of the vane.

Example vane lever arms extend between a driving end and a driven end. The driving end includes one or more features for mounting to a driver such as a synchronizing ring. The driven end includes one or more features for mounting to the associated vane OD shaft/stem to rotate said vane about its axis of rotation.

A number of constructions of vane arms exist. U.S. Pat. No. 9,988,926B2 (the '926 patent) of Gasmen et al., Jun. 5, 2018, and entitled "Machined Vane Arm of a Variable Vane Actuation System" discloses a machined vane arm. The disclosure of the '926 patent is incorporated by reference herein in its entirety as if set forth at length. The driving end has a hole/aperture for accommodating a drive pin engaged by the synchronizing ring. The driven end of the arm has a transverse groove intersecting the vane-mounting hole. The groove receives a complementary land of the vane from which a more distal portion of the stem protrudes. The groove has a base and angled side surfaces. The land has a complementary top end and side surfaces. Engagement of the groove and land side surfaces provides driving coupling.

SUMMARY

One aspect of the disclosure involves a vane arm comprising: a first end and a second end; a shank extending between the first end and the second end and having a first face and a second face; a first hole in the shank proximate the first end; a second hole in the shank proximate the second end; and a transverse groove in the first face intersecting the second hole. The groove has: a base; a first open end and a second open end; a first side face and a second side face. An asymmetry between the groove first side face and second side face provides means for uniquely angularly registering the vane arm to a shaft.

A further aspect of the disclosure involves a vane arm comprising: a first end and a second end; a shank extending between the first end and the second end and having a first face and a second face; a first hole in the shank proximate the first end; a second hole in the shank proximate the second end; and a transverse groove in the first face. The transverse groove has: a base; a first open end and a second open end; a first side face and a second side face. At least one of the transverse groove first side face and second side face has a first facet at a first angle of 0° to 20° over at least 20% of a depth of the groove. At least one of the transverse groove first side face and second side face has a second facet at a second angle of 20° to 45° over at least 50% of the depth of the groove.

In a further embodiment of any of the foregoing embodiments, additionally and/or alternatively, the second hole is of circular footprint.

In a further embodiment of any of the foregoing embodiments, additionally and/or alternatively: the second facet is between the first end and an axis of the second hole; and the second facet is at said second angle over at least 80% of the depth of the groove.

In a further embodiment of any of the foregoing embodiments, additionally and/or alternatively, the first facet is between the second end and an axis of the second hole.

In a further embodiment of any of the foregoing embodiments, additionally and/or alternatively, the first facet is at said first angle over at least 80% of the depth of the groove.

In a further embodiment of any of the foregoing embodiments, additionally and/or alternatively, side face having the first facet has a third facet, proximally of (proximal to) the first facet and a third angle of 20° to 45° over at least 20% of the depth of the groove.

In a further embodiment of any of the foregoing embodiments, additionally and/or alternatively, the first angle is 0° to 100° over at least 25% of the depth of the groove and the third angle is 20° to 45° over at least 40% of the depth of the groove.

In a further embodiment of any of the foregoing embodiments, additionally and/or alternatively, the transverse groove first side face and second side face are, over a majority of their respective areas, single planar facets.

A further embodiment of any of the foregoing embodiments may additionally and/or alternatively include a third hole between the first hole and the second hole and closer to the first hole.

A further embodiment of any of the foregoing embodiments may additionally and/or alternatively include the vane arm being machined from a nickel alloy.

In a further embodiment of any of the foregoing embodiments, additionally and/or alternatively: an average depth of the groove is at least 2.5 millimeters; a distance between centers of the first and second holes is 25 millimeters to 51 millimeters; and an overall length of the vane arm is no more than 70 millimeters.

A further aspect of the disclosure involves a vane assembly including said vane arm and further comprising a vane having an airfoil and a shaft protruding from an end of the airfoil, wherein: the vane shaft extends through the second hole; the vane shaft has first and second faces respectively abutting the transverse groove first side face and second side face; and a nut holds the vane arm to the shaft.

In a further embodiment of any of the foregoing embodiments, additionally and/or alternatively, the vane shaft first and second faces and the transverse groove first side face and second side face are configured to prevent assembly with the vane arm in an orientation 180° about an axis of the shaft.

A further embodiment of any of the foregoing embodiments may additionally and/or alternatively include a pin mounted in and protruding from the first hole.

In a further embodiment of any of the foregoing embodiments, additionally and/or alternatively, a tab washer is between the nut and the vane arm and has a tab received in third hole between the first hole and the second hole.

A further aspect of the disclosure involves a vane stage comprising a plurality of said vane assemblies, and further comprising: a synchronizing ring coupled to the vane arms and having an axis; and for each vane assembly one or more bearings mounting the vane for rotation about an axis of the vane wherein, rotation of the synchronizing ring about its axis rotates the vanes about their respective axes.

A further aspect of the disclosure involves a method for using the vane arm, the method comprising: installing the arm to a vane so that: a shaft of the vane extending from an end of an airfoil of the vane passes through the second hole; and the vane shaft abuts the third hole proximal edge and the first tab distal end edge. A nut is installed to a threaded portion of the shaft to hold the vane arm to the shaft compressed between the nut and a shoulder of the shaft.

A further embodiment of any of the foregoing embodiments may additionally and/or alternatively include: installing a pin to the first hole.

In a further embodiment of any of the foregoing embodiments, additionally and/or alternatively, the method is performed with a plurality of vane arms and the respective pins are mounted to a shared synchronizing ring.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
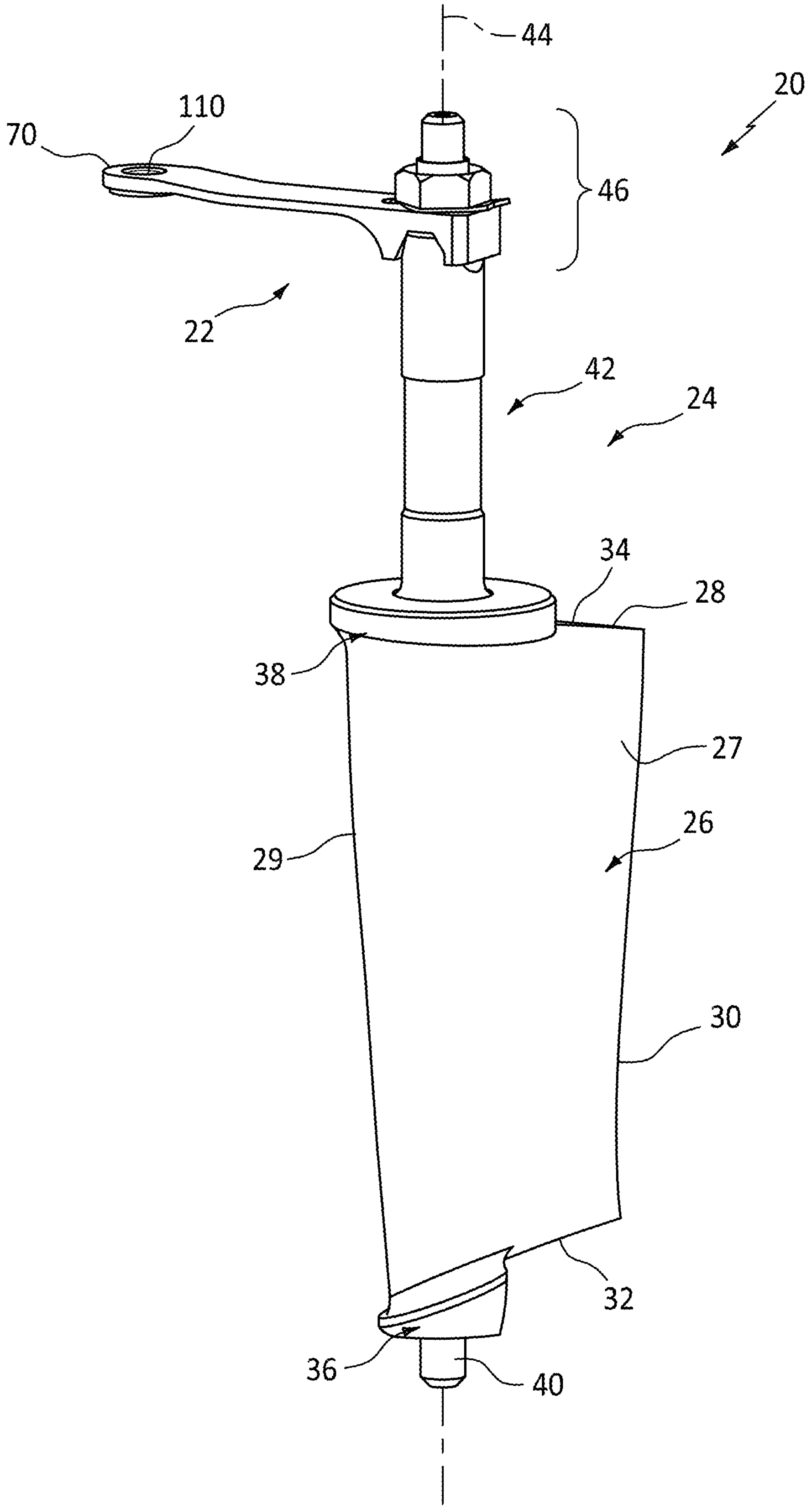
FIG. 1 is a view of a vane assembly.

FIG. 1 shows a vane assembly 20 including vane arm 22 and vane 24 configured as a modification of the baseline of the '926 patent. The modification shifts the keying function from the driven end hole 114 (FIG. 3) to the vane arm transverse groove 80. This keying is achieved by having an asymmetry between the groove sides (and, likewise between the vane ridge/land 52 sides). This is in distinction to symmetry potentially allowing two alternative installation orientations 180° from each other. With keying provided by the groove and land, the keying function may be removed from the threaded portion 50 of the shaft and the driven end hole 114. Thus, the driven end hole 114 may be circular in footprint and the shaft threads may be uninterrupted.

The vane 24 (FIG. 1) includes an airfoil 26 having a pressure side 27, a suction side 28, a leading edge 29, and a trailing edge 30. The airfoil extends along a span from an inner diameter (ID) end 32 to an outer diameter (OD) end 34. Such ID and OD are measured essentially relative to the engine centerline. The airfoil ID and OD ends respectively merge, along forward/leading portions thereof, with respective ID and OD platforms 36 and 38. Respectively inward and outward from the platforms 36 and 38 are an ID shaft 40 and an OD shaft 42. The shafts are coaxial along a vane axis 44 which forms an axis of rotation and axis of threads of a threaded portion 50 discussed below. The OD shaft 42 includes a distal mounting section 46 for mating with the vane arm 22.

Figure 2:
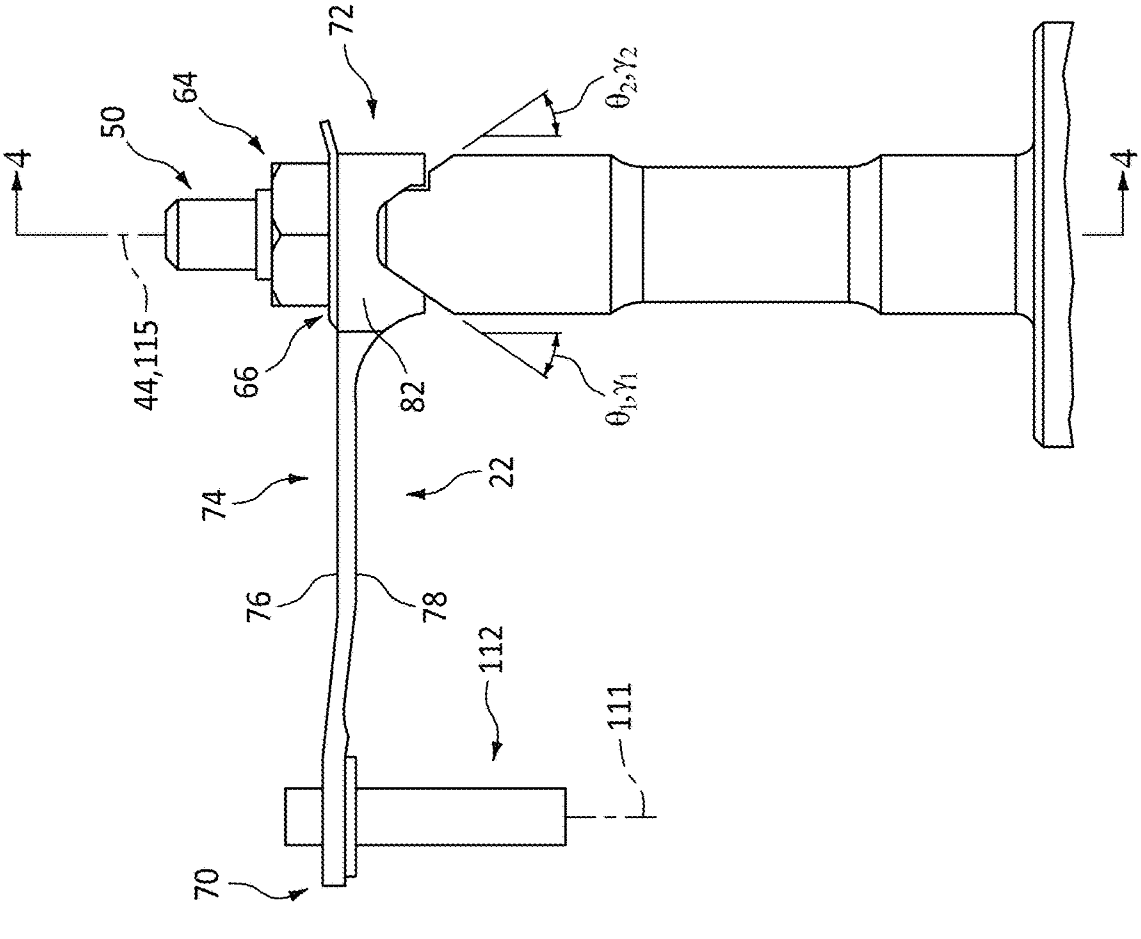
FIG. 2 is a first side view of the vane arm region.

The mounting section 46 includes an externally threaded section/region/portion 50 (FIG. 3) with a transverse ridge or land 52 radially inward thereof or proximal relative to the airfoil. A necked region 54 is between the ridge/land 52 and the threaded portion 50, The ridge/land is a faceted section having opposed first and second faceted sides 55, 56. FIG. 2 shows a nut 64 installed to the threaded section 50 and a tab washer 66 between the nut and the arm. The tab washer has an annular body 68 (FIG. 3) and a tab 69 bent at an angle thereto.

The arm 22 (FIG. 2) extends generally from a first end 70 to a second end 72. In this example, the first end 70 is a driving end and the second end 72 is a driven end. The example arm 22 is formed from machined metal stock (e.g., nickel-based alloy/superalloy such as AMS 5596 or AMS 5662-UNS N07718). The arm 22 has a shank 74 extending between the first end and the second end and having a first face 76 and a second face 78. In an example method of manufacture, the arm is machined from billet stock.

Figure 3:
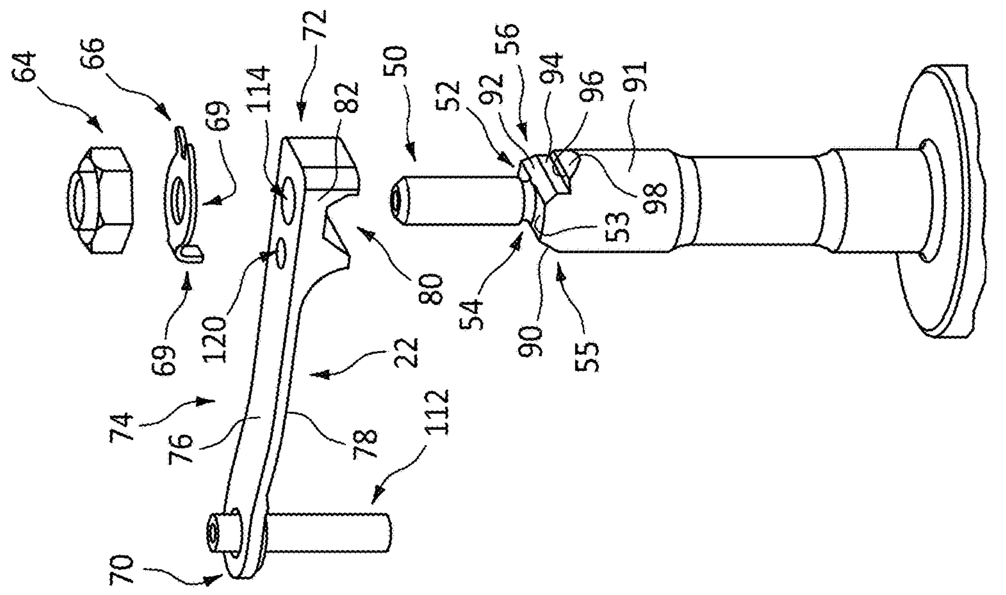
FIG. 3 is an exploded view of the vane arm region.
Figure 9:
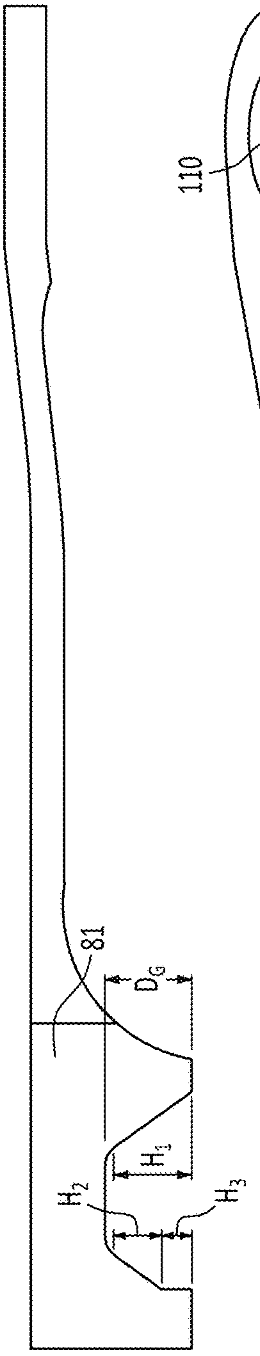
FIG. 9 is a first side view of the vane arm.
Figure 7:
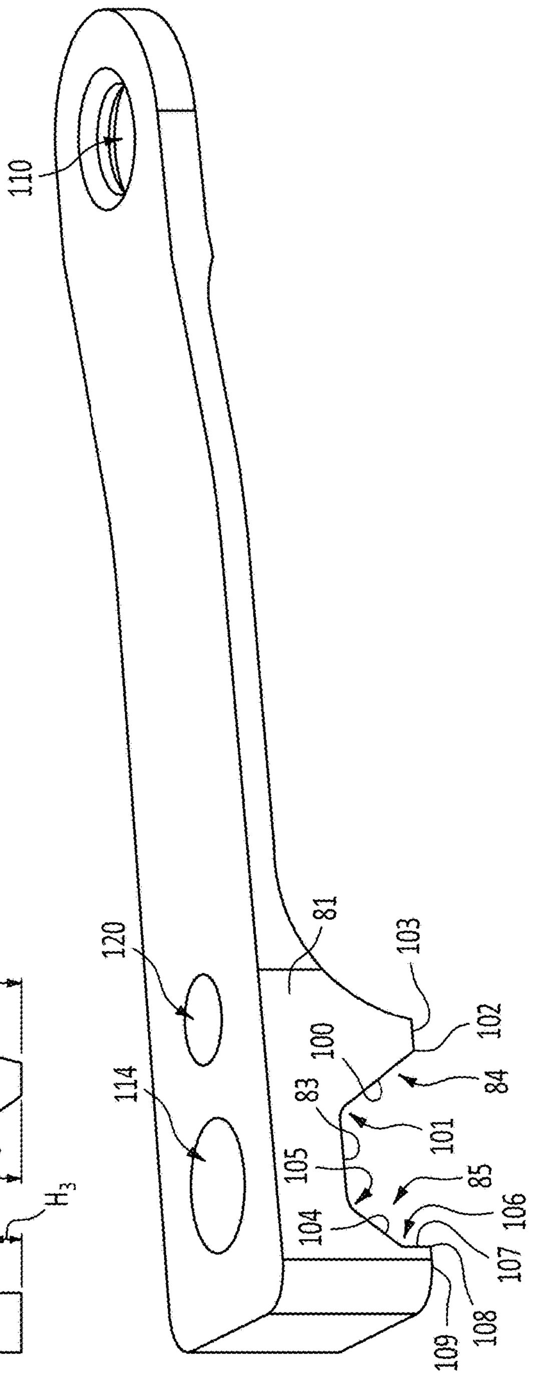
FIG. 7 is view of a vane arm of the assembly.

FIG. 3 shows the vane arm 22 having a transverse groove 80 extending between a first side face 81 (FIG. 7) and a second side face 82 (FIG. 3). The transverse groove 80 has a base surface 83 (FIG. 7) and sides 84, 85. As is discussed further below, the sides 84 and 85 are shaped to respectively contact the sides 55 and 56 in an installed condition. An example groove depth $D_G$ (FIG. 9) is about 0.12 inch (3.0 millimeters), more broadly 2.5 millimeters to 7.0 millimeters or 2.5 millimeters to 6.0 millimeters or 2.5 millimeters to 4.0 millimeters. FIG. 3 shows the ridge 52 as having an apex 53 with sections diametrically opposite each other about the axis 44. As is discussed further below, the first side 55 comprises a single facet 90 (FIG. 3). The example facet 90 extends from an approximate linear intersection with the apex 53 and has an arcuate boundary with a cylindrical surface 91 of the shaft 42 therebelow (proximally thereof (proximal thereto)). The second side 56 comprises multiple facets with a distal facet 92 having a similar intersection with the apex surface 55. However, the example second facet extends only down to a linear junction with a facet 94. As is discussed further below, the facet 94 is relatively more axial than the facets 92 and 90 and, in the illustrated example is exactly axial. The facet 94 extends downward/proximally to an intersection with a relatively radial shoulder surface 96 which in turn has an intersection with a lowest facet 98. The example facets 92 and 98 are parallel, with the facet 98 slightly recessed (FIG. 5A) from the facet 92.

The arm groove sides 84 and 85 have surface portions angled and positioned to contact facets of the ridge sides 55 and 56, respectively. The example groove side 84 (FIG. 7) comprises a single facet 100 of depth or height $H_1$ (FIG. 9) extending downward (outward relative to the groove) from a rounded transition 101 with the base 83 to an intersection 102 with a flat 103. Similarly, the side 85 comprises a facet 104 of depth or height $H_2$ extending from a rounded transition 105 to an intersection 106 with a second facet 107 of depth or height $H_3$ which in turn extends to an intersection 108 with a lower surface 109. In the installed condition, the facet 101 lies flat against the facet 90 and the facet 104 lies flat against the facet 92.

Example $H_1$ is at least 50% of $D_G$ or at least 60% or at least 80% and may represent the entirety except for the rounded transition 101 if present. Example $H_2$ is at least 30% of $D_G$ or at least 40% or at least 50% with an example 50% to 75%. Example $H_3$ is at least 20% of $D_G$ or at least 25% with an example 25% to 35%. These values are measured away from the intersection of the groove with the hole.

Figure 5:
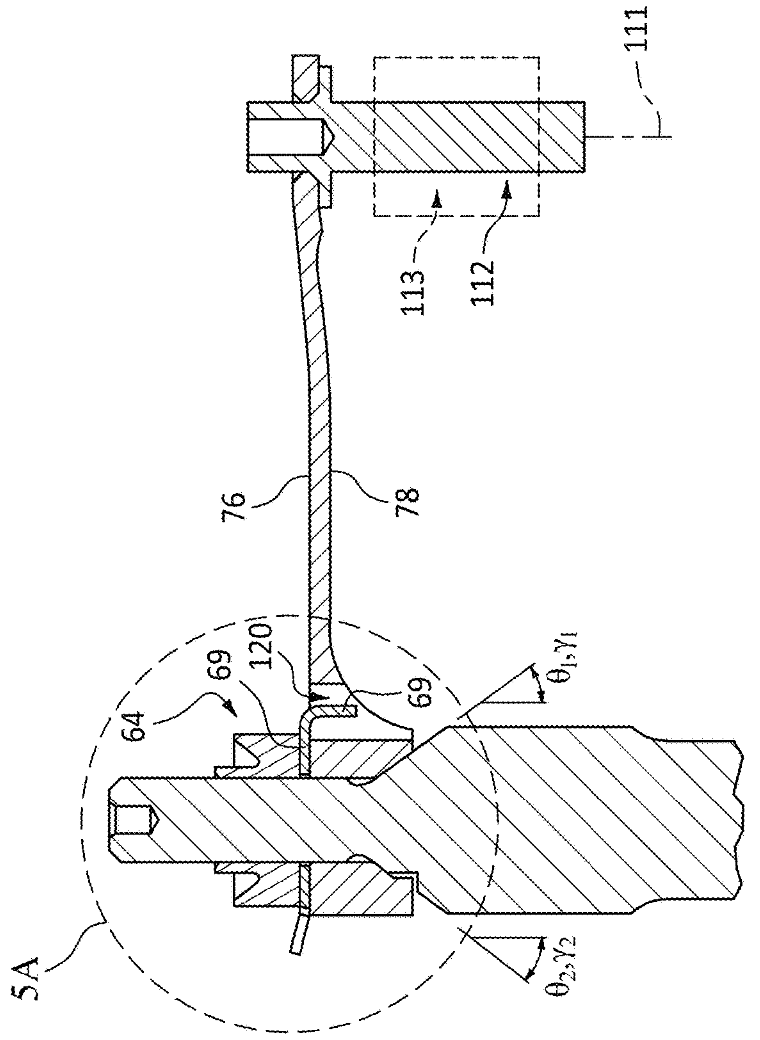
FIG. 5 is a sectional view of the vane arm region taken along line 5-5 of FIG. 4.
Figure 4:
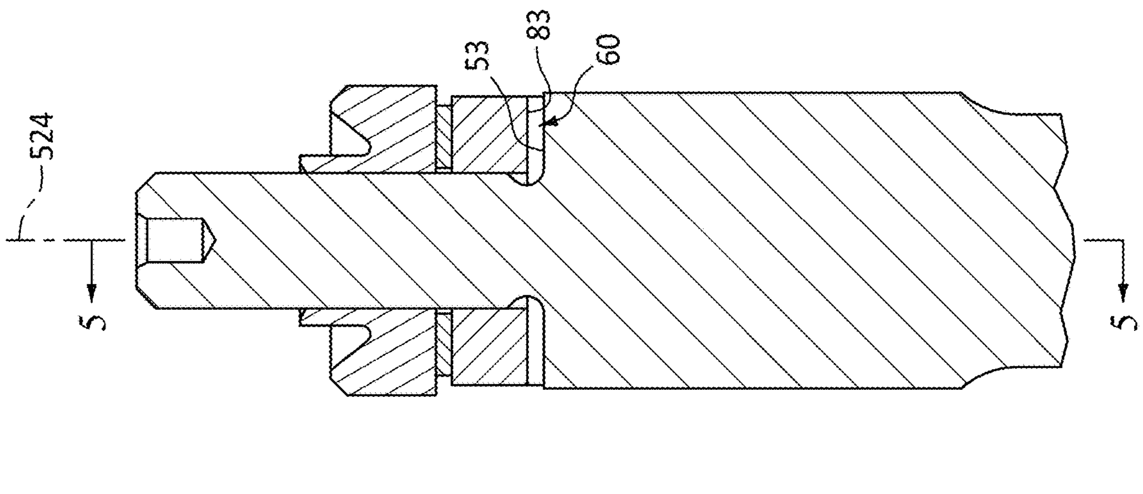
FIG. 4 is a sectional view of the vane arm region taken along line 4-4 of FIG. 2.
Figure 5A:
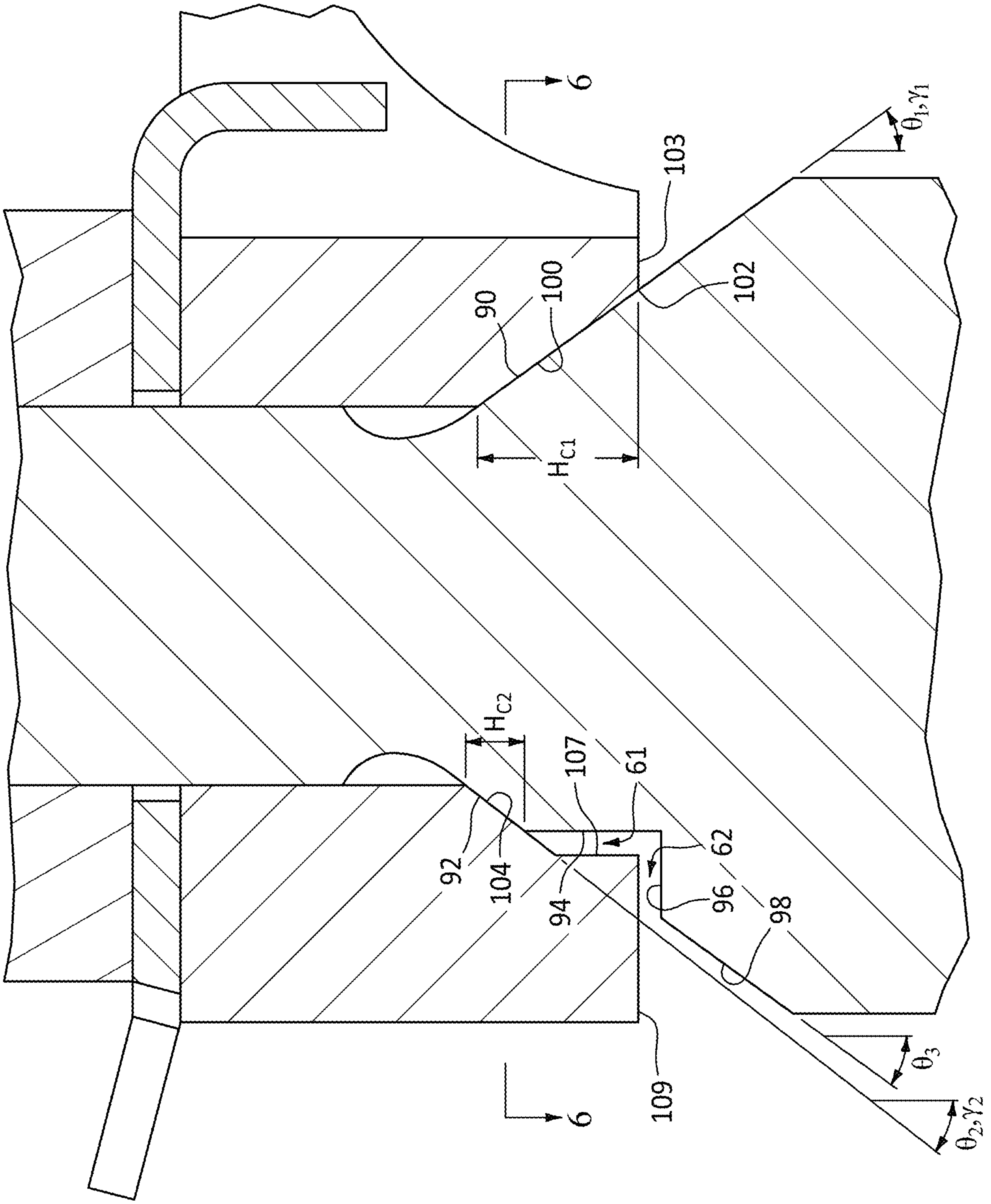
FIG. 5A is an enlarged view of an arm-to-vane connection of FIG. 5.
Figure 10:
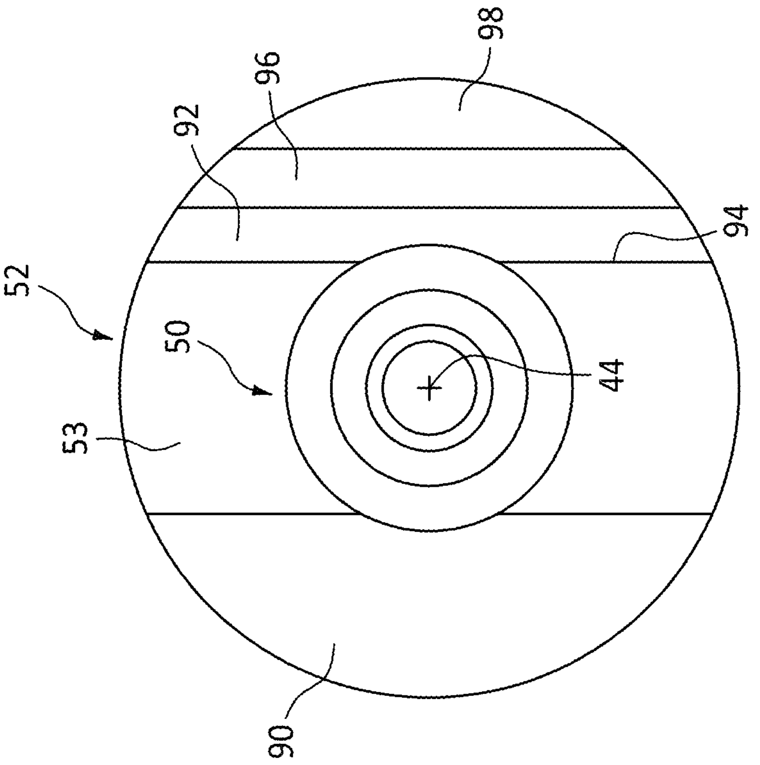
FIG. 10 is an outer diameter view of an outer diameter (OD) shaft section of the vane of the assembly.
Figure 6:
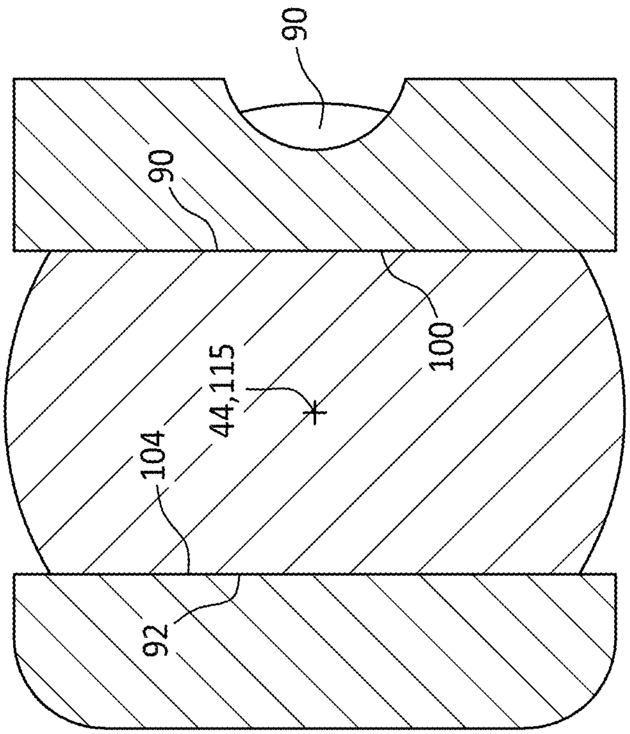
FIG. 6 is a transverse sectional view of the connection taken along line 6-6 of FIG. 5A2.

FIG. 5A shows the installed condition as having a gap 60 of generally L-section with an axial leg 61 between the faces 94 and 107 and a radial section 62 between the surfaces 109 and 96. FIG. 5A shows engagement height $H_{C1}$ between the surfaces 90 and 100 and $H_{C2}$ between the surfaces 92 and 104. In the longitudinal plane 524 forming the cut plane of FIG. 5, $H_{C1}$ and $H_{C2}$ reach their minimum due to the interruption of the faces 100 and 104 by the hole 114. Example $H_{C1}$ is 0.106 inch (2.7 millimeters) away from the hole 114 and about 0.08 inch (2.0 millimeters) at the hole.

Example $H_{C2}$ is 0.068 inch (1.7 millimeters) away from the hole 114 and about 0.041 inch (1.0 millimeter) at the hole.

Figure 1A:
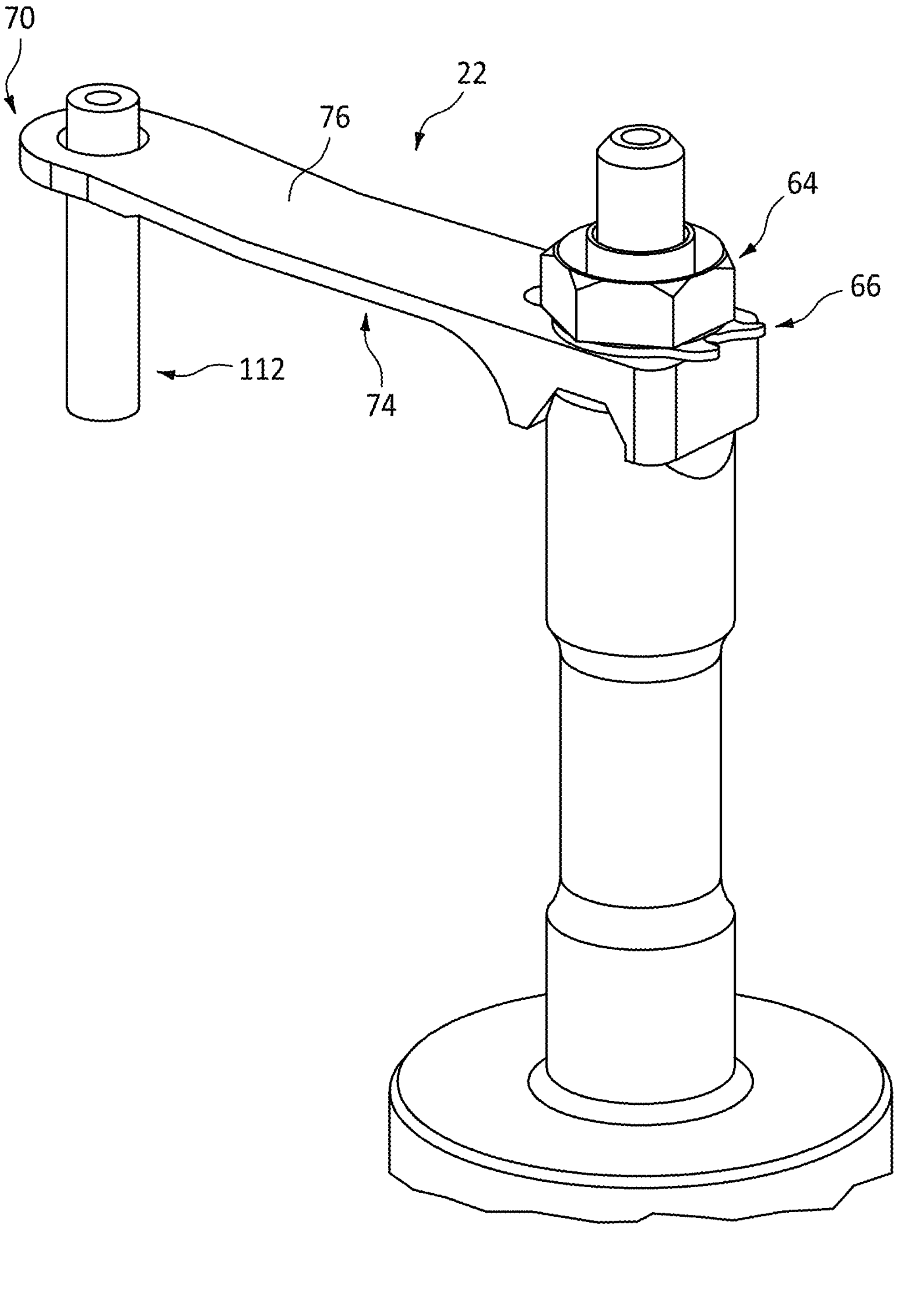
FIG. 1A is an enlarged view of a vane actuating arm region of the assembly of FIG. 1.
Figure 8:
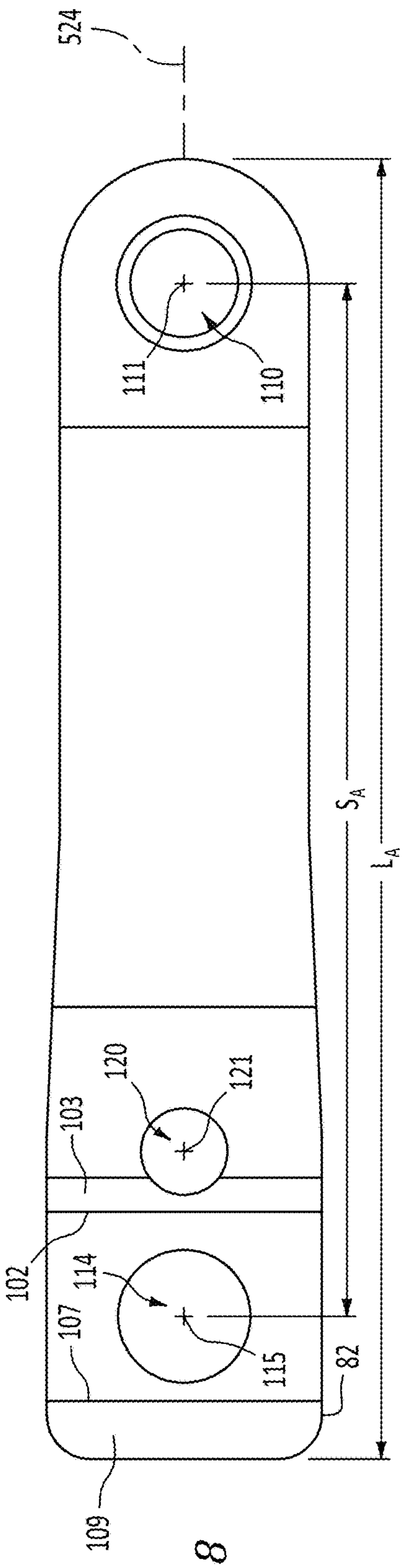
FIG. 8 is an inner diameter (ID) view of the vane arm.

The example vane arm has exactly three through-holes. A first through-hole 110 (FIG. 9) is adjacent the first end 70 for receiving a driving pin 112 (FIGS. 1A&2) which, in turn, is mounted to a synchronizing ring 113 (FIG. 2) in common with the pins of the other vanes of the stage. A second through-hole 114 is near the second end and receives the OD shaft 42. The example second hole 114 is of circular cross-section dimensioned to just accommodate the threaded section 50. The hole 110 has an axis 111 shared with the pin 112. The second hole 114 has an axis 115 coaxial with the axis 44 in a mounted condition. An example hole-to hole distance or separation $S_A$ (FIG. 8) is about 1.5 inch (38 millimeters), more broadly 25 millimeters to 51 millimeters or 37 millimeters to 43 millimeters. An example overall length $L_A$ is about 1.7 inch (43 mm), more broadly 30 millimeters to 80 millimeters or 35 millimeters to 60 millimeters. Example arm width (also groove length) WA is about 0.4 inch (10 millimeters), more broadly 7 millimeters to 20 millimeters or 8 millimeters to 15 millimeters.

A third hole 120 (FIG. 9) is formed in the distal shank just to the first end side of the second hole 114 for receiving/accommodating the washer tab 69.

The second hole 114 intersects the surfaces 83, 84, and 85. FIG. 5 shows a section with longitudinal cut plane parallel to (namely, containing) the axes 44, 115. In that central plane and planes parallel thereto, relative to an axial direction and relative to a transverse plane parallel to and optionally containing such axis, the facets 92, 94, and 98 are at angles $\theta_1$, $\theta_2$, and $\theta_3$, respectively. Similarly, the groove facets 100 and 104 are at angles $\gamma_1$ and $\gamma_1$, respectively. The example facets 94 and 107 are at such angles (not labeled) illustrated as zero. Example angles $\gamma$ and $\theta$ are about 35°, more broadly, 20° to 45° or 20° to 40° or 30° to 40°.

Any to all of these associated pairs of angles may exist over the majorities of the contact areas at either or both sides or at least 90%, or an example 100%

In use, in a nominal installation situation the vane arm groove sides 84,85 would seat onto the facets/flats 59, 59 of the vane. The technician may install the pre-bent tab washer 66 with the pre-bent tab 69 inserting into the hole 120 the vane arm. The technician may then thread on the nut 64 and torque it onto the tab washer to finalize the assembly.

If non-nominal installation is attempted slightly biased to one side of angular registry about the axis 44, as the technician assembles the vane arm to the stem of the vane the flats would turn the vane stem to align with the vane arm and enable proper assembly.

In an extreme off-nominal assembly of 180° misregistry about the axis 44, as the technician slides the vane arm slides onto the stem of the vane the small end section of the vane arm groove would contact the wider end section of the stem ridge and prevent further assembly with clear visual indications that the arm was not seated properly. The delta between the two gap face sizes and heights in conjunction with the compound angle of the flats enables mistake proofing of the vane arm on to the vane stem.

The modification shifts the keying function from the driven end hole to the groove. This keying is achieved by having a non-zero transverse angle between the groove sides (and, likewise between the land sides) and the sloping groove base. With keying provided by the groove/land, the keying function may be removed from the threaded portion of the shaft and the driven end hole. Thus, the driven end hole may be circular in footprint and the shaft threads may be uninterrupted.

Relative to the baseline, such modification may offer one or more of several advantages. The driven end hole may be easier to form (e.g., drill). The step of grinding the shaft flat may be eliminated as may be any thread dressing or touch up required by pre-forming or post-forming the shaft flat. Keying may be improved, particularly with greater angles. Notably, whereas a parallel orientation of the groove and land sides would potentially offer two equivalent keying orientations, the angled configuration may limit to a single keying orientation.

Figure 11:
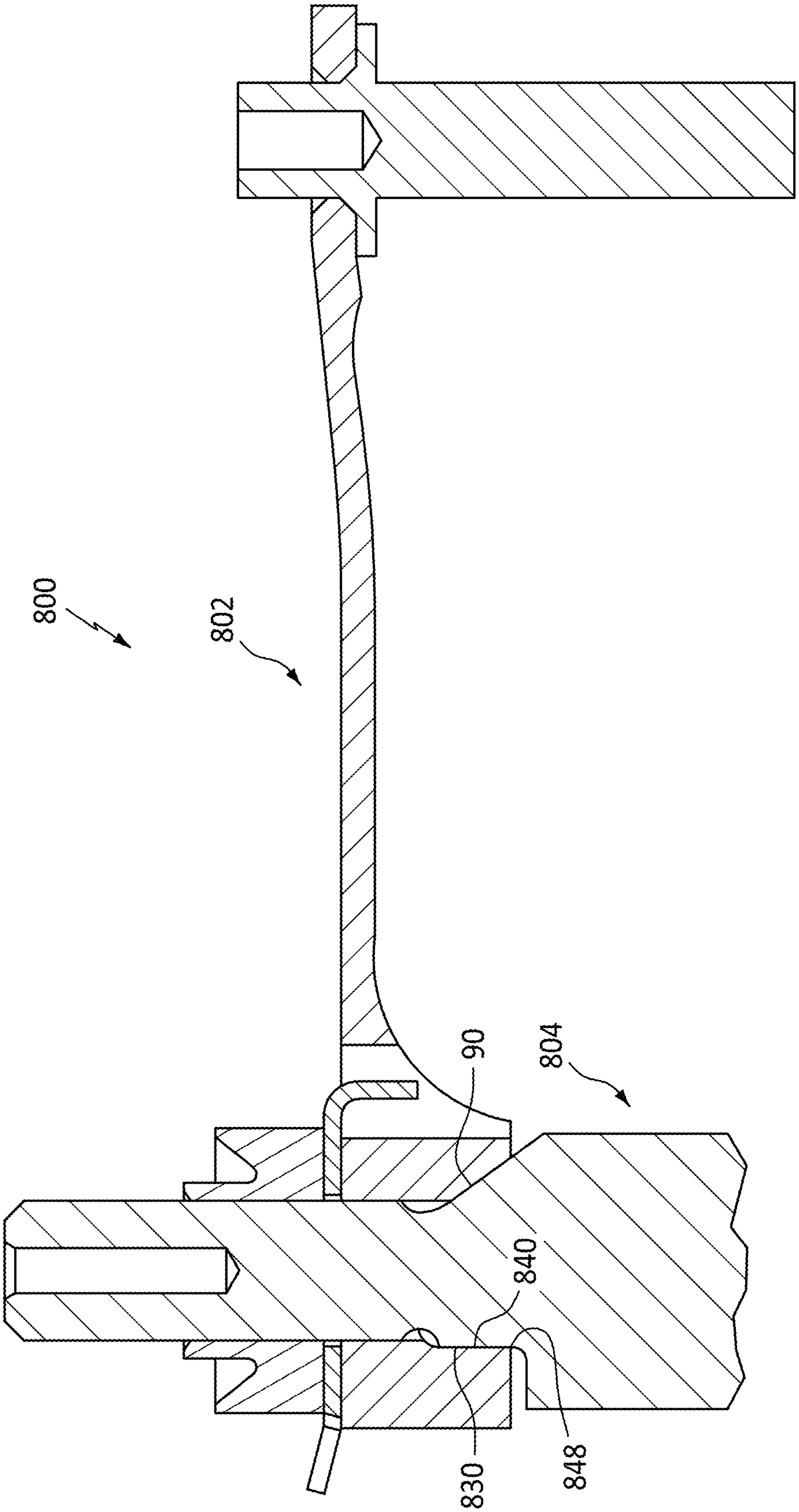
FIG. 11 is a sectional view of an alternative arm and vane.
Figure 11A:
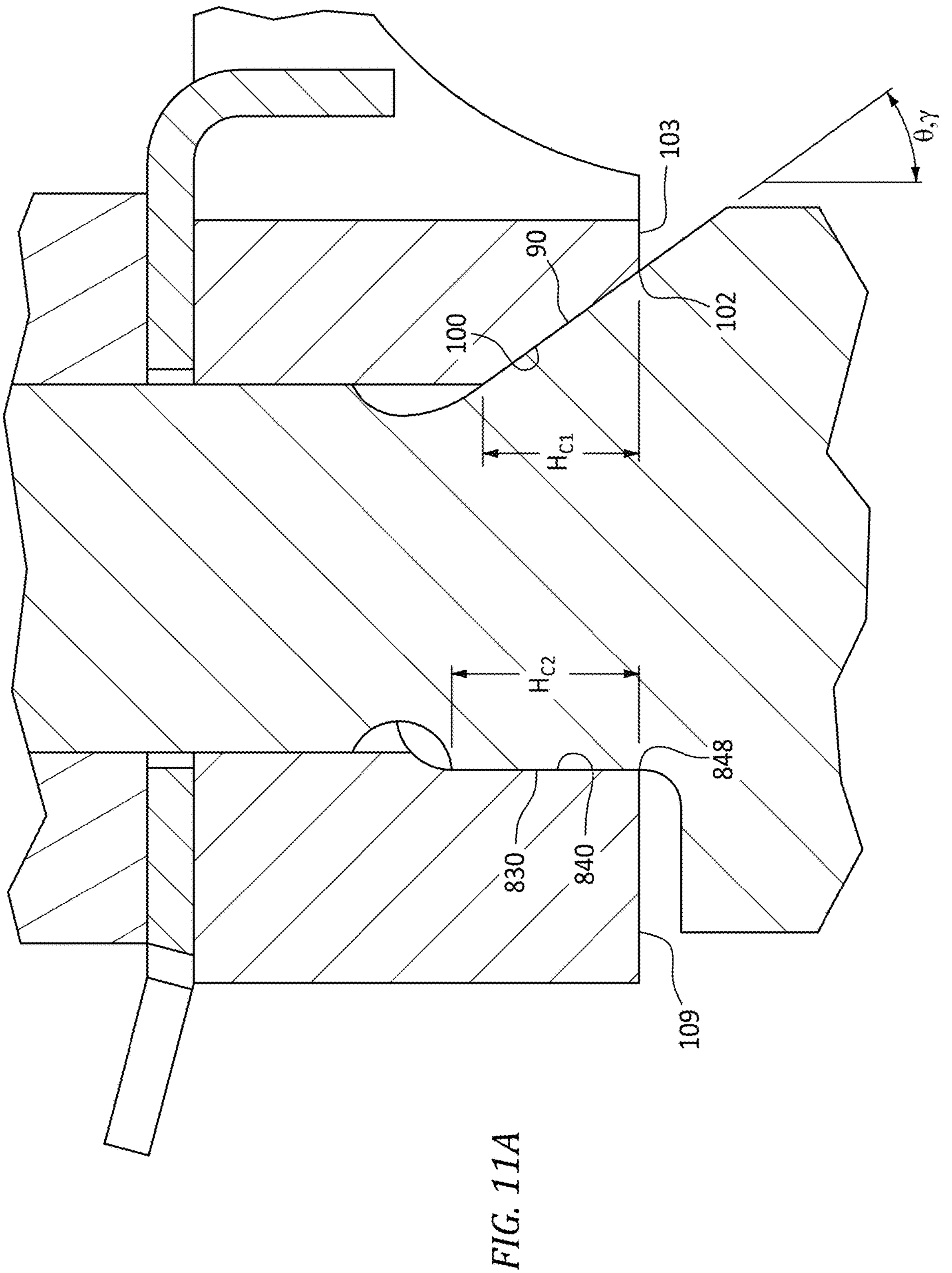
FIG. 11A is an enlarged view of an arm-to-vane connection of FIG. 11.
Figure 13:
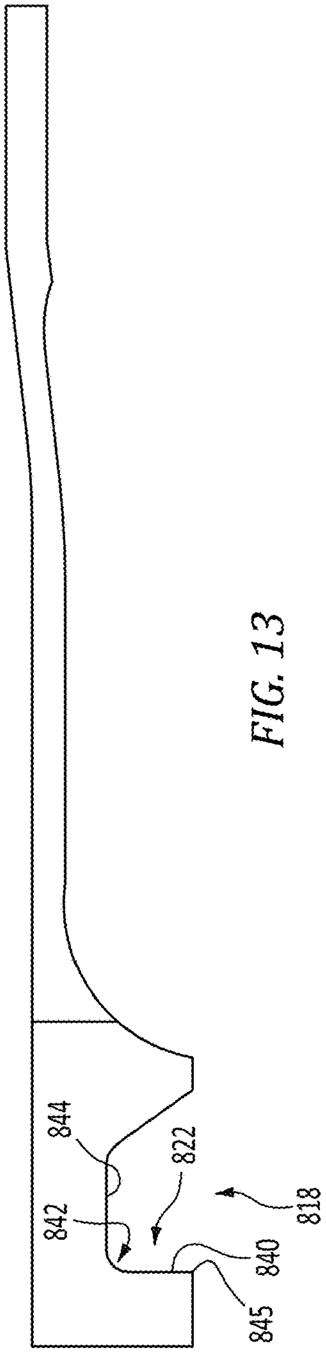
FIG. 13 is a side view of the arm of FIG. 11.
Figure 12:
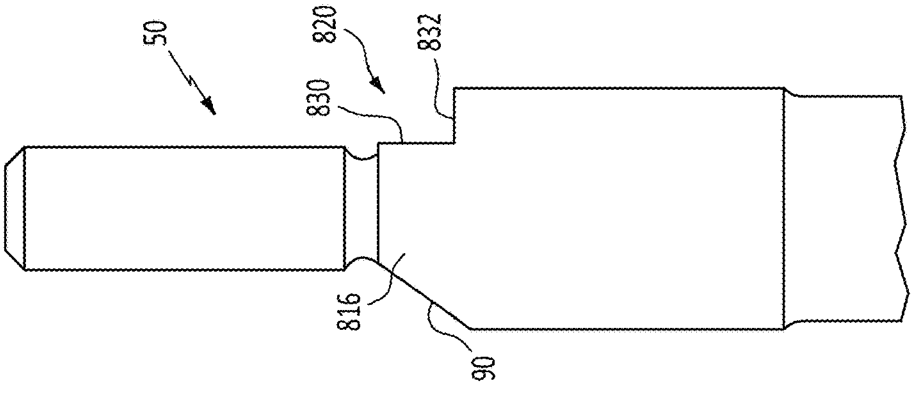
FIG. 12 is a side view of an outer diameter end region of the vane of FIG. 11.

FIG. 11 shows a vane assembly 800 with an alternate arm 802 and an alternate vane 804 otherwise similar to that described above but differing in the configuration of the second sides 820, 822 of the ridge/land 816 and the groove 818. The first sides are otherwise the same as discussed above. The ridge second side 820 has a generally axial facet 830 and a generally radial facet 832 defining a shoulder. The groove second side 822 has a generally axial facet 840 with rounded transition 842 to the groove base 844. Essentially, $H_2$ goes to zero or nearly that and $H_3$ goes to nearly 100% of $D_G$ (e.g., at least 80% or at least 90% given rounded transition, etc.). In the installed condition, the first sides mate in similar fashion to that described above. The second sides mate differently. In this FIG. 11 embodiment, the axial faces 830, 840 contact each other and provide a load-bearing interaction. In various embodiments, this configuration may bring the intersection 848 closer to the axis 44 so that keying may yet be further improved. In the event of a 180° mis-registry, the intersection 848 will contact the surface 96 and hold the arm in a noticeably elevated condition.

The use of “first”, “second”, and the like in the following claims is for differentiation within the claim only and does not necessarily indicate relative or absolute importance or temporal order. Similarly, the identification in a claim of one element as “first” (or the like) does not preclude such “first” element from identifying an element that is referred to as “second” (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A vane arm comprising:

a first end and a second end;

a shank extending between the first end and the second end and having a first face and a second face;

a first hole in the shank proximate the first end;

a second hole in the shank proximate the second end;

a transverse groove in the first face and having:

a base;

a first open end and a second open end;

a first side face and a second side face, wherein:

at least one of the transverse groove first side face and second side face has a first facet at a first angle of 0° to 20° over at least 20% of a depth of the groove;

at least one of the transverse groove first side face and second side face has a second facet at a second angle of 20° to 45° over at least 50% of the depth of the groove; and the side face having the first facet has a third facet, proximal to the first facet and a third angle of 20° to 45° over at least 20% of the depth of the groove.

2. The vane arm of claim 1 wherein:

the second hole is of circular footprint.

3. The vane arm of claim 1 wherein:

the second facet is between the first end and an axis of the second hole; and the second facet is at said second angle over at least 80% of the depth of the groove.

4. The vane arm of claim 1 wherein:

the first facet is between the second end and an axis of the second hole.

5. The vane arm of claim 4 wherein:

the third angle is 20° to 45° over at least 40% of the depth of the groove.

6. The vane arm of claim 5 wherein:

the second facet is at said second angle over at least 80% of the depth of the groove.

7. The vane arm of claim 1 wherein:

the third angle is 20° to 45° over at least 40% of the depth of the groove.

8. The vane arm of claim 7 wherein:

an average depth of the groove is at least 2.5 millimeters;

a distance between centers of the first and second holes is 25 millimeters to 51 millimeters; and an overall length of the vane arm is no more than 70 millimeters.

9. The vane arm of claim 1 further comprising:

a third hole between the first hole and the second hole and closer to the first hole.

10. The vane arm of claim 1 being machined from a nickel alloy.

11. The vane arm of claim 1 wherein:

an average depth of the groove is at least 2.5 millimeters;

a distance between centers of the first and second holes is 25 millimeters to 51 millimeters; and an overall length of the vane arm is no more than 70 millimeters.

12. A vane assembly including the vane arm of claim 1 and further comprising a vane having an airfoil and a shaft protruding from an end of the airfoil, wherein:

the vane shaft extends through the second hole;

the vane shaft has first and second faces respectively abutting the transverse groove first side face and second side face; and a nut holds the vane arm to the shaft.

13. The vane assembly of claim 12 wherein:

the vane shaft first and second faces and the transverse groove first side face and second side face are configured to prevent assembly with the vane arm in an orientation 180° about an axis of the shaft.

14. The vane assembly of claim 13 further comprising:

a pin mounted in and protruding from the first hole.

15. The vane assembly of claim 12 wherein:

a tab washer is between the nut and the vane arm and has a tab received in third hole between the first hole and the second hole.

16. A vane stage comprising a plurality of vane assemblies of claim 12, and further comprising:

a synchronizing ring coupled to the vane arms and having an axis; and for each vane assembly one or more bearings mounting the vane for rotation about an axis of the vane wherein, rotation of the synchronizing ring about its axis rotates the vanes about their respective axes.

17. A method for using the vane arm of claim 1, the method comprising:

installing the arm to a vane so that:

a shaft of the vane extending from an end of an airfoil of the vane passes through the second hole; and the vane shaft abuts the third hole proximal edge and the first tab distal end edge; and installing a nut to a threaded portion of the shaft to hold the vane arm to the shaft compressed between the nut and a shoulder of the shaft.

18. The method of claim 17 further comprising:

installing a pin to the first hole.

19. The method of claim 17 wherein:

the method is performed with a plurality of vane arms and the respective pins are mounted to a shared synchronizing ring.

* * * * *